United States Patent
Sung et al.

(10) Patent No.: US 10,590,905 B2
(45) Date of Patent: Mar. 17, 2020

(54) FLOATING APPARATUS FOR WAVE POWER GENERATION

(71) Applicants: INGINE, INC., Seoul (KR); Yong Jun Sung, Guri-si (KR)

(72) Inventors: Yong Jun Sung, Guri-si (KR); Min Su Cho, Seoul (KR); Jung Hee Kim, Seoul (KR)

(73) Assignees: INGINE, INC., Seoul (KR); Young Jun Sung, Guri-Si (KR)

( * ) Notice: Subject to any disclaimer, the term of this patent is extended or adjusted under 35 U.S.C. 154(b) by 0 days.

(21) Appl. No.: 15/739,954

(22) PCT Filed: Mar. 3, 2016

(86) PCT No.: PCT/KR2016/002127
§ 371 (c)(1),
(2) Date: Dec. 26, 2017

(87) PCT Pub. No.: WO2016/208843
PCT Pub. Date: Dec. 29, 2016

(65) Prior Publication Data
US 2018/0187644 A1 Jul. 5, 2018

(30) Foreign Application Priority Data

Jun. 24, 2015 (KR) .................. 10-2015-0089620

(51) Int. Cl.
*F03B 13/18* (2006.01)
*B63B 21/50* (2006.01)
(Continued)

(52) U.S. Cl.
CPC .......... *F03B 13/1885* (2013.01); *B63B 21/50* (2013.01); *B63B 35/44* (2013.01);
(Continued)

(58) Field of Classification Search
CPC ................................................. F03B 13/1885
(Continued)

(56) References Cited

U.S. PATENT DOCUMENTS 5,889,336 A * 3/1999 Tateishi ............. F03B 13/1865
290/43
6,695,536 B2 * 2/2004 Sanchez Gomez ....... E02B 9/08
290/42
(Continued)

FOREIGN PATENT DOCUMENTS

KR 2001-0100372 A 11/2001
KR 10-2010-0133364 A 12/2010
(Continued)

OTHER PUBLICATIONS

International Search Report dated May 27, 2016 in corresponding International Patnet Application No. PCT/KR2016/002127 (2 pages in English and 2 pages in Korean).

*Primary Examiner* — Viet P Nguyen
(74) *Attorney, Agent, or Firm* — The PL Law Group, PLLC (57) ABSTRACT

The floating apparatus for wave power generation according to the present invention includes; a floating unit floating on a sea surface; an energy unit configured to convert a kinetic energy of the floating unit to an electric or hydraulic energy; and a transfer unit configured to transfer the kinetic energy of the floating unit to the energy unit.

4 Claims, 6 Drawing Sheets

(51) Int. Cl.
  *B63B 35/44* (2006.01)
  *F16G 11/12* (2006.01)
  *B63B 22/02* (2006.01)
(52) U.S. Cl.
  CPC .......... *F03B 13/18* (2013.01); *F03B 13/1865* (2013.01); *F16G 11/12* (2013.01); *B63B 22/02* (2013.01); *B63B 2035/4466* (2013.01); *F05B 2260/505* (2013.01); *Y02E 10/38* (2013.01)
(58) Field of Classification Search
  USPC ..................................................... 290/42, 53
  See application file for complete search history.

(56) References Cited

U.S. PATENT DOCUMENTS

| | | | | |
|---|---|---|---|---|
| 7,731,847 B2* | 6/2010 | Ton That | ............. | B01D 61/025 210/257.2 |
| 7,791,213 B2* | 9/2010 | Patterson | ............ | F03B 13/1865 290/53 |
| 8,276,377 B2* | 10/2012 | Patton | ................. | F03B 13/1865 290/42 |
| 9,062,649 B2* | 6/2015 | Greco | ................. | F03B 13/1815 |
| 2007/0018458 A1* | 1/2007 | Martinez | ............. | F03B 13/1885 290/53 |
| 2011/0018275 A1* | 1/2011 | Sidenmark | .......... | F03B 13/1815 290/53 |
| 2011/0304145 A1* | 12/2011 | Raisch | ................ | F03B 13/1865 290/53 |
| 2013/0009402 A1* | 1/2013 | Williams | ............... | F03B 13/182 290/53 |
| 2014/0152015 A1* | 6/2014 | Sidenmark | .......... | F03B 13/1885 290/53 |

FOREIGN PATENT DOCUMENTS

| | | |
|---|---|---|
| KR | 10-2014-0120150 A | 10/2014 |
| WO | WO 2014/153618 A1 | 10/2014 |

* cited by examiner

FLOATING APPARATUS FOR WAVE POWER GENERATION

CROSS REFERENCE TO RELATED APPLICATIONS

This application is a U.S. National Stage Application of International Application No. PCT/KR2016/002127, filed on Mar. 3, 2016, which claims the benefit under 35 USC 119(a) and 365(b) of Korean Patent Application No. 10-2015-0089620, filed on Jun. 24, 2015, in the Korean Intellectual Property Office.

TECHNICAL FIELD

The exemplary embodiments of the present invention generally relate to a floating apparatus for wave power generation configured to convert kinetic wave energy to useable energy in a high efficiency and low cost manner.

BACKGROUND ART

Although energy resources are limited, interests in renewable energy free from environmental pollution aside from fossil fuel have heightened, as energy consumption rapidly increases and environmental problems caused by increases in global warming and carbon emission increase. Waves are high density energy sources among the renewal energy sources, and receive great attention because of capability of generating energy 24 hours a day.

Although the Korean Registered Patent No.:10-1260037 discloses "a structure of break water for wave power generation system", the structure may be limited in wave energy yield efficiency and may be also limited in installation at coastal topography and depth of water.

CITED REFERENCE DOCUMENT

Patent Document

Korean Registered Patent Publication NO.:10-1260037

DISCLOSURE OF INVENTION

Technical Subject

The present invention is disclosed to solve the disadvantages/problems, and to provide a floating apparatus for wave power generation configured to convert kinetic wave energy to electric or hydraulic energy in a high efficiency and low cost manner.

Technical Solution

According to an aspect of the present invention, there is provided a floating apparatus for wave power generation, the apparatus comprising:
  a floating unit floating on a sea surface;
  an energy unit configured to convert a kinetic energy of the floating unit to an electric or hydraulic energy; and
  a transfer unit configured to transfer the kinetic energy of the floating unit to the energy unit,
  Preferably, but not necessarily, the transfer unit and the energy unit are provided at an inside of the floating unit.

In another aspect of the present invention, there is provided a floating apparatus for wave power generation, the apparatus comprising:
  a floating unit floating on a sea surface;
  a wire floatably fixing the floating unit;
  an anchoring unit fixing a distal end of the wire to a sea bottom surface; and
  a safety coupling separating the wire and the floating unit in order to relieve an excessive tension of the wire.

Advantageous Effect of the Invention

The floating apparatus for wave power generation according to the present invention has an advantageous effect in that a floating unit can be moored using a wire to reduce the initial installation costs and construction costs over those using the pile type, self-weight type and jacket type marine facilities.

The floating apparatus for wave power generation according to the present invention has another advantageous effect in that a barge or a floating body is used as a floating unit to enable a recycling of a waste ship and a reduced cost. Furthermore, a barge is used as a floating unit to make it easy to install and dismantle a floating apparatus for wave power generation.

The floating apparatus for wave power generation according to the present invention has another advantageous effect in that motions of various directions can be efficiently absorbed because generation is made by a mechanical energy transfer through a wire. The floating apparatus for wave power generation according to the present invention has another advantageous effect in that a high efficiency apparatus can be implemented because tension of wire that changes to all directions where the floating unit performs a translational movement or a rotational movement can be converted to an energy. All the energies can be absorbed relative to various movements of the floating unit.

The floating apparatus for wave power generation according to the present invention has another advantageous effect in that a plurality of passage units is spaced apart at a predetermined distance, such that even if one passage unit is included to a rotation shaft of the floating unit, and if another passage unit is deviated from a position of the rotation shaft, the wire passing the passage unit that is deviated from the rotation shaft is generated with a tension to enable absorption of energy.

The floating apparatus for wave power generation according to the present invention has another advantageous effect in that the wave power is transferred to land by absorbing the wave power from an inner energy unit of the floating unit to an electric or hydraulic energy to thereby reduce a marine installation cost.

The floating apparatus for wave power generation according to the present invention has another advantageous effect in that the apparatus is disposed with a safety coupling for resolving an excessive tension on a wire and a display floating body enabling a position of an anchoring unit from a sea surface, to thereby enable a safe evacuation during storm.

BEST MODE

Now, configuration and operation of a floating apparatus for wave power generation according to the present invention (hereinafter referred to simply as "floating apparatus") will be described in detail with reference to FIGS. 1 to 10.

Hereinafter, a direction perpendicular to a sea surface (11) is defined as a vertical direction, and a direction included in a sea surface (11) is defined as a horizontal direction.

Figure 1:
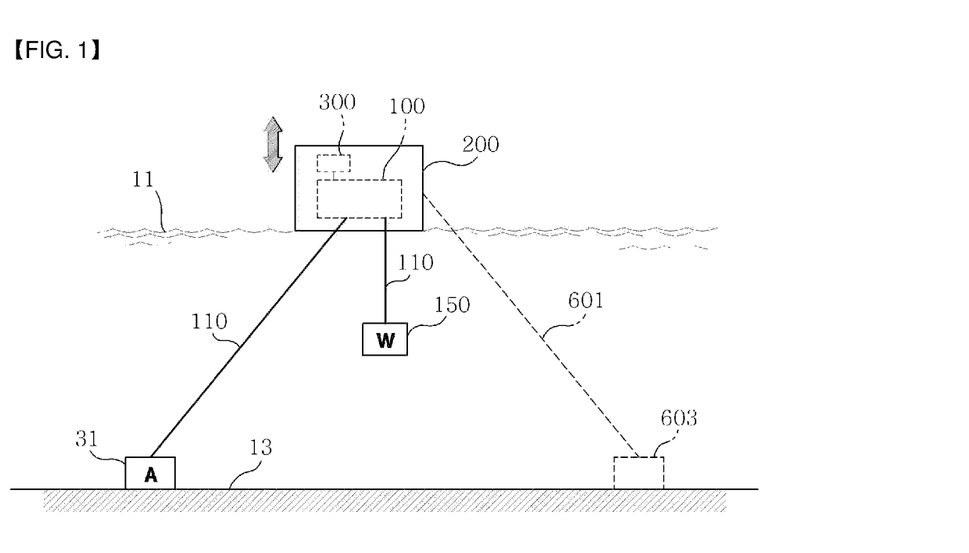
FIG. 1 is a schematic view illustrating a floating apparatus for wave power generation according to the present invention.

The floating apparatus may include a floating unit (200) floating on a sea surface (11), a transfer unit (100) configured to absorb a kinetic energy of the floating unit (200), and an energy unit (300) configured to convert the kinetic energy absorbed by the transfer unit (100) to other types of energies such as electric or hydraulic energy.

The floating unit (200) may be disposed therein with a transfer unit (100) and an energy unit (300). Diameter of the floating unit (200) may be 5~15 m. This size is a size capable of most efficiently absorbing the wave energy generated from an area having a depth of water of approximately 5 m.

The floating unit (200) may be a barge. It is possible to use waste barges to thereby save costs because the pre-existent barges can be used as the floating unit (200). Furthermore, it is easy to install and/or dismantle a generation device, because the barges are used as the floating unit (200).

The floating unit may be formed with a material having a specific gravity smaller than that of water, and may be formed, for example, with a single material of smaller specific gravity, or may use a frame structure for reinforcing strength as a framework, and a floating material is coupled to around the framework to allow the floating unit to have buoyance on the whole.

The floating unit (200) can float freely on the sea surface, such that a position restricting means is required to fix the floating unit to a desired position area. Toward this end, a wire, a mooring cable (601) or an anchoring wire may be used.

The mooring cable may be a mere position restricting means that is not connected to a transfer unit but simply connects the floating unit to a mooring support (603).

Figure 3:
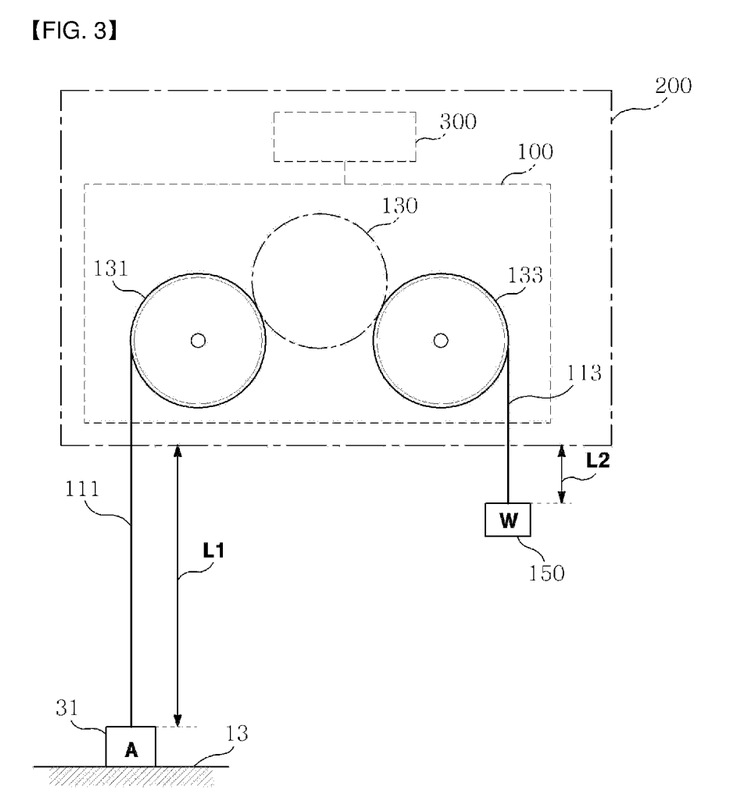
FIG. 3 is a schematic view illustrating a relationship between a weight unit and an anchoring unit.
Figure 4:
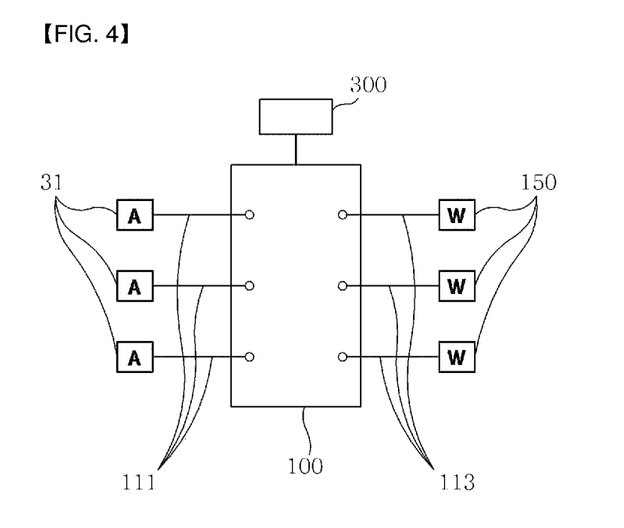
FIG. 4 is a conceptual view illustrating a transfer unit according to the present invention.
Figure 5:
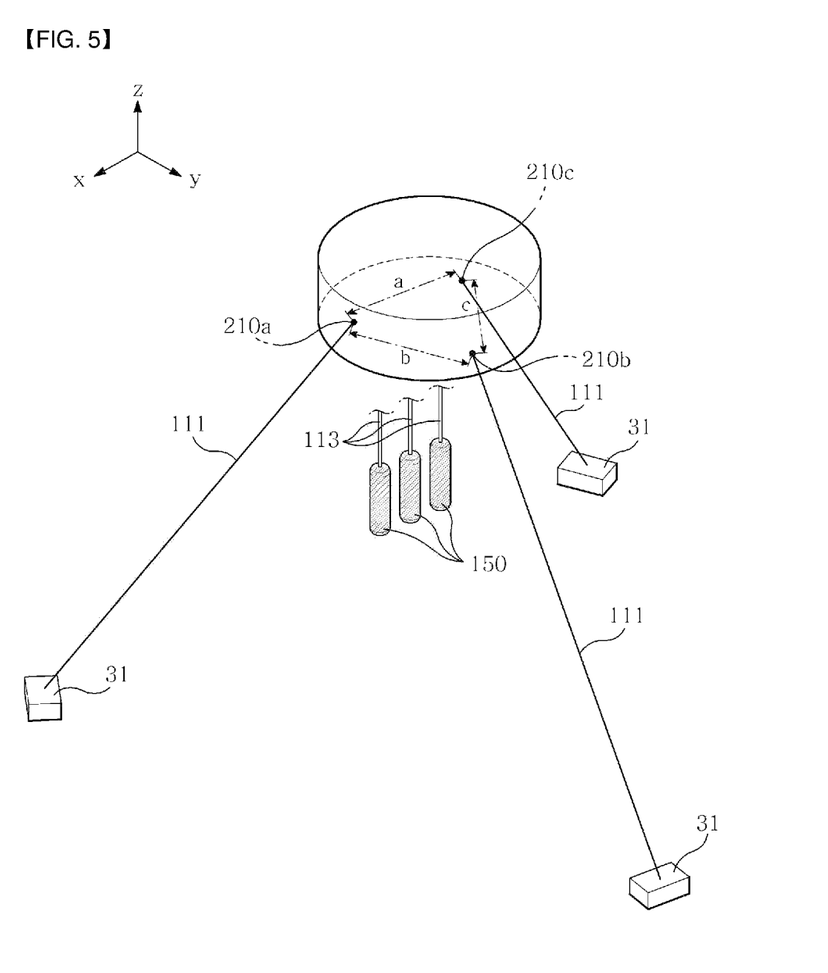
FIG. 5 is a perspective view illustrating a floating apparatus for wave power generation according to the present invention.

Although FIG. illustrates that one strand of wire absorbs the wave energy, the present invention is not limited thereto, and a plurality of wires may be provided as explained in FIG. 4 and subsequent drawings. Each wire may include at least one of an anchoring wire and a weight wire illustrated in FIG. 3 and subsequent drawings. The anchoring wire shows an exemplary embodiment illustrated in FIG. 3 and subsequent drawings, and is an example of position restricting means transmitting the wave energy to the transfer unit by connecting the transfer unit with the anchoring unit.

The wire illustrated in FIG. 1 is a means transmitting the wave power to the transfer unit by being provided between the floating unit and the anchoring unit, and may be a position restricting means restricting a floating position of the floating unit.

The floating unit may be moored to an area on the sea surface using a wire (110). The floating unit (200) may not be deviated (detached) from an area on the sea surface to an outside of a predetermined scope by being moored by the wire (110). The floating apparatus according to the present invention can reduce initial installation costs and construction costs over other marine facilities fixing the floating unit (200) by pile type, self-weight type and jacket type methods by mooring the floating unit (200) using a wire (110).

Referring to FIG. 1, a distal end of the wire (110) may be connected to an anchoring unit (31), where the anchoring unit (31) may be fixed to a sea bottom surface (13). The anchoring unit (31) functions to tightly fix a distal end of the wire (110) to one area of the sea bottom surface (13).

In one exemplary embodiment, the anchoring unit (31) may be at least one of concrete block, a tetra-port, an anchor, a gabion, a pile and a jacket. When an anchor fixed by a distal end of the wire (110) is fixed to a sea bottom surface (13), and a gabion is put on the anchor, the distal end of the wire (110) can be tightly fixed to one area of the sea bottom surface (13). A gabion may be a cage, cylinder, or box filled with rocks, concrete, or sometimes sand and soil for use in civil engineering, road building, military applications and landscaping. When the wire (110) is initially fixed to the sea bottom surface (13) using an anchor, and the anchor is secondarily fixed by being covered with a weight of gabion, the distal end of the wire (110) can be more tightly and securely fixed to the sea bottom surface (13).

The floating unit (200) initially absorbs the wave energy as a mechanical energy is not fixedly installed on a sea surface or a sea bed. The floating unit (200) may vertically, horizontally or rotatively move in response to movement of waves because of being moored to a sea surface by the wire (110).

The changes in tension or length of wire (110) in response to the vertical/horizontal movement or rotatative movement about x axis/y axis/z axis of the floating unit (200) are initially absorbed by a mechanical kinetic energy of the floating unit.

The floating apparatus according to the present invention can efficiently absorb movements of various directions because of the electric generation through the wire (110).

Albeit not being illustrated, as a comparative exemplary embodiment of the present invention for comparison with the present invention, in case of absorbing movement of an object moving through a rigid guide structure, an external force relative to other action force of different direction than a guide direction of a guide cannot be absorbed because movement of the object is enforced to a movement direction of the guide.

In contrast, according to the present invention, the floating unit (200) can perform a translational or rotational movement relative to all the translational movement of x axis/y axis/z axis directions or rotational movement about the x axis/y axis/z axis. When the tension of the wire (110) change to all directions, the kinetic energies of all directions or the kinetic energies of all types for the floating unit (200) can be absorbed.

That is, the changes of wave power acting on the floating unit are converted to an electric energy by tension change of wire or drum winding of wire. The translational kinetic energy or rotational kinetic energy of the floating unit for all axes is the strong point used in the electric generation by being transmitted to an energy unit by the wire.

Each wire may include at least one of the anchoring wire or the weight wire. The wire (110) may be connected to a transfer unit (100) inside the floating unit (200). To be more specific, the wire (110) may be connected to the transfer unit (100) through passage units (210a, 210b, 210c) formed at the floating unit (200). The passage units (210a, 210b, 210c) may be sliding bearings or free rotating pulleys in order to reduce the frictional force acting on the wire to a minimum. The passage units (210a, 210b, 210c) may be tightly sealed using a sealing member in order to prevent sea water from penetrating an inside of the floating unit while the movement of the wire is allowed to move freely.

In the exemplary embodiment illustrated in FIG. 1 where a single wire is installed, a mooring cable (601) may be installed as a position restricting means in order to prevent the floating unit (200) from being displaced or deviated from a desired position area. The mooring cable may be a position restricting means simply connecting a floating unit and a mooring support (603) while not being connected to the transfer unit.

The exemplary embodiment of FIG. 1 explains a case where the wire is provided in a single number. Even if the wire is provided in a single number, the polymoderative kinetic energy of the floating unit can be absorbed, which was already explained in the foregoing elaboration. When the wire is provided in a plural number by further improving the wire, the absorption efficiency of the polymoderative kinetic energy can be further increased. That is, installation of a plurality of wires may be a means to increase the energy absorption efficiency.

The wire (110) may be provided in a plural number and each distal end may be fixed to a sea bottom surface (13) by the anchoring unit (31). Furthermore, the passage units (210a, 210b, 210c) may be also provided in as many plural numbers as those of the wire (110), and each wire (110) may be connected to the transfer unit (100) through mutually different passage units (210a, 210b, 210c). The passage units (210a, 210b, 210c) may be holes or slots guiding the wire (110) to the transfer unit (100). The passage units (210a, 210b, 210c) may determine the positions where the wire (110) is inserted from an outside of the floating unit (200) to an inside of the floating unit.

In order to absorb the polymoderative kinetic energy through the plurality of wires, the plurality of passage units (210a, 210b, 210c) is preferably spaced apart at a predetermined distance. When the wire is inserted from an outside of the floating unit (200) to an inside of the floating unit through the passage units (210a, 210b, 210c), the passage units (210a, 210b, 210c) may be spaced apart in their positions at a predetermined distance.

As illustrated in FIGS. 5 to 10, the positions of the passage units (210a, 210b, 210c) may be mutually spaced apart as much as a, b and c. This is a structure to absorb the translational kinetic energy as well as the rotational kinetic energy of the floating unit (200) relative to all the translational movements of x axis/y axis/z axis directions or rotational movements about the x axis/y axis/z axis into the polymoderative kinetic energy.

Albeit not being illustrated, as an imaginary comparative exemplary embodiment apart from the present invention, if the plurality of passage units (210a, 210b, 210c) is positioned at one point, all the translational movements of x axis/y axis/z axis directions or rotational movements about the x axis/y axis/z axis cannot be absorbed.

Meantime, when the floating unit (200) rotates, and a central axis of the rotational movement passes the said one point, there may be no change in tension of the wire (110), and absorption performance of the polymoderative kinetic energy may deteriorate.

In contrast, the present invention is such that the plurality of passage units (210a, 210b, 210c) is spaced apart at a predetermined distance. In an exemplary embodiment, and with reference to FIG. 6, even if an imaginary central axis (m) of the rotational movement at the floating unit (200) passes at least one of the passage units (210a, 210b, 210c), other passage units (210a, 210b, 210c) are displaced or deviated from the central axis (m) of the rotational movement. Thus, the wire (110) having passed the passage units (210a, 210b, 210c) deviated from the central axis (m) of the rotational movement can be changed in tension or can transfer an energy.

Hereinafter, the imaginary central axis (m) of rotational movement at the floating unit is defined as a rotation shaft (m) of the floating unit. The rotation shaft (m) of the floating unit is changed in response to wave status and is not a fixed shaft. For example, the roll, pitch and yaw movements of the floating unit in addition to the translational movement is defined as a rotational movement of the floating unit, or a combined force of at least two of the roll, pitch and yaw movements is defined as a rotational movement of the floating unit. At this time, the rotation shaft (m) of rotational movement at the floating unit may exist at a particular moment, which is defined as a rotation shaft (reference numeral m in FIG. 6) of the floating unit, for the convenience of explanation. The rotation shaft of the floating unit is an imaginary shaft.

In the present invention, all the translational movements of x axis/y axis/z axis directions or rotational movements about the x axis/y axis/z axis can be converted to electric energy. To this end, at least three passage units (210a, 210b, 210c) are preferably required. Meantime, the at least three passage units (210a, 210b, 210c) are not preferably positioned on a common straight line (m).

In an exemplary embodiment, even if two passage units (210a, 210c) are included in the rotation shaft (m) of the floating unit (200), another passage unit (210b) may not be included in the rotation shaft (m). The another passage unit (210b) may be spaced apart from the rotation shaft (m) as much as a discrete distance (n).

Figure 6:
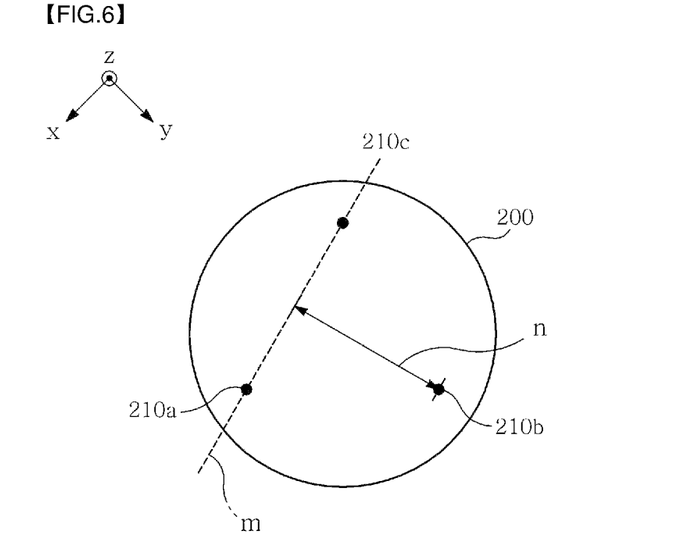
FIG. 6 is a conceptual view illustrating a relationship of a position of a passage unit at a floating unit according to the present invention.

Referring to FIG. 6, the wire (110) passing through the passage unit (210b) distanced from the rotation shaft (m) is pulled as much a length as multiplied by a distance (n) spaced apart from a rotation angle of rotation shaft (m) and a rotation shaft (m) of the passage unit (210b), and generation of electricity from the energy unit can be increased in proportion to the pulled length of the wire.

In order to effectively absorb the rotational movement, at least three passage units (210a, 210b, 210c) may be formed, where two passage units (210a, 210c) may be arranged on an imaginary straight line (m), and the other remaining passage unit (210b) may be spaced apart from the imaginary straight line (m) at a predetermined distance (n).

Assuming that a point for three wires connected to an inside of the floating unit to face the floating unit from an outside of the floating unit is a face-to-face point, three face-to-face points may be positioned at an apex of imaginary triangle.

The wavelength of waves is not constant, and changes in time. The present invention is so constructed as to absorb all the translational movements of x axis/y axis/z axis directions or rotational movements about the x axis/y axis/z axis regardless of the length of wavelength.

When the wavelength of wave is greater than a diameter of the floating unit, it is preferable that energy be absorbed by the translational movement of the floating unit instead of rotational movement of the floating unit. Meanwhile, when the wavelength of wave is smaller than a diameter of the floating unit, it is preferable that energy be absorbed by the rotational movement of the floating unit instead of translational movement of the floating unit. As analyzed above, depending on the wavelength, it is efficient to absorb the rotational movement at some times, and it is efficient to absorb the translational movement at some other times. In order to enhance the homeostasis in the generation of electricity, the wire arrangement structure may have the polymoderative energy absorption relative to all the translational movements and the rotational movements.

For example, when the wavelength is twice the diameter of the floating unit (200), the floating unit (200) may ascend toward an apex of the wave, and when the wave passes away, the floating unit may descend to absorb the vertical movement with a higher ratio. When the wavelength is smaller than the diameter of the floating unit (200), the inclination change or rotational movement of the floating unit (200) may be absorbed at a higher ratio.

The plurality of wires and arrangement structure at a predetermined distance according to the present invention are very important for generation of electricity of high efficiency, polymoderative generation of electricity, homeostasis in the generation of electricity, environmental adaptability and responsiveness to changes in waves.

The kinetic energy of the floating unit transmitted to the wire may be transmitted to the transfer unit. The transfer unit (100) can transmit to the energy unit (300) at the rear end the tensile force generated from vertical/horizontal movements or rotational movement by the waves.

Means are required for strength of stability of the floating unit to the initial position and smoothness of generation of electricity of the energy unit. For example, the transfer unit (100) may transmit some of the kinetic energy of the floating unit to the energy unit through the transfer unit, and remaining kinetic energy may be stored in an energy smoothing means. An example of the energy smoothing means may be a weight unit.

The transfer unit may include a weight unit (150) storing the kinetic energy of the floating unit in a potential energy (position energy). The weight unit (150) may be connected to the transfer unit (100) through the wire (110), and may be positioned in the water between the floating unit (200) and the sea bottom surface (13).

The weight unit (150) may be a substance higher in specific gravity than the water. The weight unit (150) may perform a vertical movement relative to the sea surface (11). The weight unit (150) must receive less resistance of the water because fast movement is efficient to the generation of electricity. Thus, the weight unit (150) may take a streamlined shape such that a diameter of a direction perpendicular to the sea surface (11) is smaller than a diameter of a direction horizontal to the sea surface (11).

Each wire may include at least one of the anchoring wire and the weight wire. The anchoring wire (111) may be extended from the transfer unit (100) to the anchoring unit (31). The weight wire (113) may be extended from the transfer unit (100) to the weight unit (150).

When the floating unit reaches a high mark of wave, the floating unit rises and some of the kinetic energy may be dynamically transmitted to the energy unit through the anchoring wire, and remaining some kinetic energy may raise the weight unit to be stored in a position energy. When the high mark of wave passes, the floating unit may be such that the weight unit descends other than its own weight to increase the strength of stability of the floating unit using the position energy of the weight unit. As a result, the improvement of strength of stability of the floating unit with respect to the initial position as well as energy smoothing can be accomplished.

The transfer unit (100) may rise, translate or rotate relative to the floating unit (200) to grow apart a distance between the anchoring unit (31) and the floating unit (200). When the distance between the anchoring unit (31) and the floating unit (200) grows apart, tension on the anchoring wire (111) may increase. When the tension of the anchoring wire (111) increases, some of the energy applied to the anchoring wire (111) may be transmitted to the energy unit (300) through the transfer unit (100). The remaining some energy applied to the anchoring wire (111) may be stored as a potential energy by allowing the weight unit (150) to be pulled up from the sea bottom surface (13) through the transfer unit (100).

Successively, when the floating unit (200) returns to its original position by being descended, translated or rotated, the distance between the floating unit (200) and the anchoring unit (31) gets closer to reduce the tension of the anchoring wire (111). At this time, the potential energy stored while the weight unit (150) descends may be transmitted to the energy unit (300). Even when the tension is not existent on the anchoring wire (111), the weight unit (150) descends to implement the energy smoothing by the power being transmitted to the energy unit (300).

In sum, when the tension increases on the anchoring wire (111) by the periodic motion of the wave, the energy itself applied to the anchoring wire (111) may be transmitted to the energy unit (300), and when the tension of the anchoring wire (111) decreases, the potential energy stored in the weight unit (150) may be transmitted to the energy unit (300), whereby the energy unit (300) can be implemented with the energy smoothing.

The transfer unit (100) may include an anchoring shaft (131) wound with the anchoring wire (111), and a weight shaft (133) wound with the weight wire (113), and may further include a power transfer unit (130) transferring the power of the anchoring shaft (131) or the weight shaft (133) therebetween.

The anchoring wire (111) and the weight wire (113) may be mutually separated independent wires (110), and may transmit the power therebetween through the power transfer unit (130).

The anchoring wire (111) and the weight wire (113) may be mutually separated to allow being wound independently on the anchoring shaft (131) and the weight shaft (133), and the anchoring shaft (131) and the weight shaft (133) may be connected with a different gear ratio through the power transfer unit (130). For example, when the anchoring shaft (131) is rotated 10 times, the weight shaft (133) may be made to rotate once. When the anchoring shaft (131) and the weight shaft (133) are connected with a mutually different gear ratio, the length of the anchoring wire (111) and the weight wire (113) being wound or being unwound may be made to be different.

Figure 2:
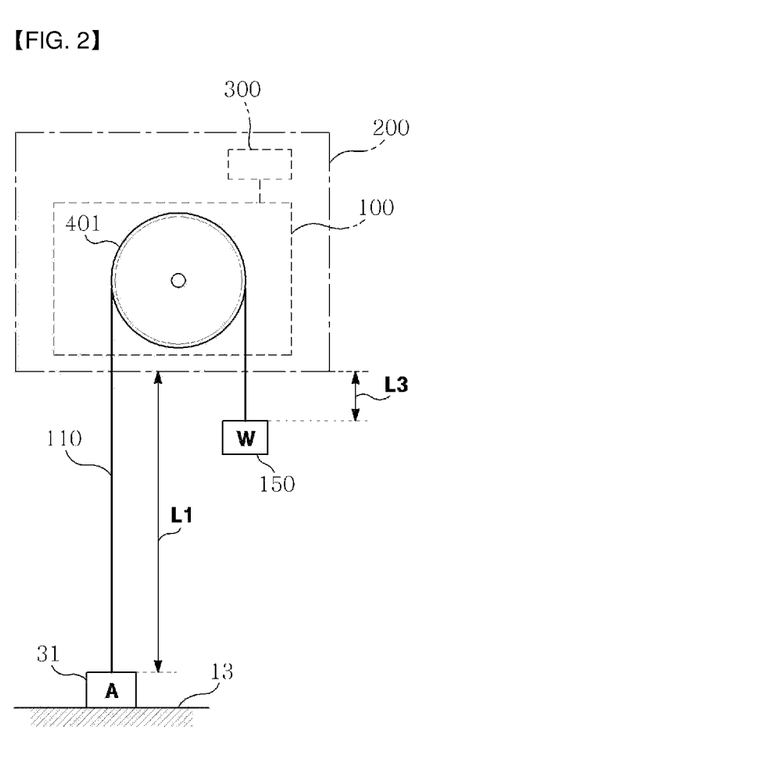
FIG. 2 is a schematic view illustrating a relationship between a weight unit and an anchoring unit, as a comparative exemplary embodiment for comparison with the present invention.

Referring to FIG. 2 as a comparative exemplary embodiment, when the anchoring wire (111) and the weight wire (113) are connected to one strand of wire (110), and when a distance (L1) between the floating unit (200) and the anchoring unit (31) is made to be changed to reduce the wire (110) at the anchoring side, a distance (L3) between the floating unit (200) and the weight unit (150) may be reduced or elongated to a length same as a length where the L1 is elongated or reduced.

However, as illustrated in FIG. 3, when the anchoring wire (111) and the weight wire (113) are separated, a rotation (amount) of the anchoring shaft (131) and a rotation (amount) of the weight shaft (133) may be differentiated in response to shifting ratio of the power transfer unit (130). The change of distance (L2) between the floating unit (200) and the weight unit (150) may be made to be greater or smaller than the change of L1 in response to the change of distance (L1) between the floating unit (200) and the anchoring unit (31). For example, when the distance between the floating unit (200) and the anchoring unit (31) is reduced by 3 meters, a distance between the floating unit (200) and the weight unit (150) may be made to be elongated only by 1 meter.

In one exemplary embodiment, it is preferable that the rotation of the anchoring shaft (131) be greater than the rotation of the weight shaft (133). Furthermore, when the rotation ratio between the anchoring shaft (131) and the weight shaft (133) is increased, it is preferable that the weight of the weight body be also proportionately increased. When constructed as explained above, the distance and time required for the weight unit (150) to move may be shortened, whereby the wave energy can be quickly absorbed even during a short wave period.

Furthermore, the collision possibility of the weight unit (150) with the floating unit (200) or the sea bottom surface can be reduced because the weight wire (113) is changed very little relative to the length change of the anchoring wire (111). For example, when the floating apparatus according to the present invention is installed at an area with a water level (depth) of 5 m, and when the length of the weight unit (150) is 1 meter, and the weight unit (150) is installed to be positioned at a center between the floating unit (200) and the sea bottom surface (13), the weight unit (150) can obtain a flow distance of 2 meters vertically. At this time, if the floating unit (200) is distanced from an original position even by 2 meters, the weight unit (150) may collide with the floating unit (200) or the sea bottom surface (13). However, assuming that the anchoring shaft (131) and the weight shaft (133) are connected at a 1:3 gear ratio, the weight unit (150) may collide when the floating unit (200) is distanced at least more than 6 meters from the original position.

Thus, a quick energy absorption and collision prevention of the weight unit (150) can be accomplished by allowing the anchoring wire (111) and the weight wire (113) to be mutually independently formed, and the anchoring shaft (131) and the weight shaft (133) to be connected with a mutually different gear ratio.

The transfer unit (100) may transfer the power to the energy unit (300) by way of rotation movement. The anchoring shaft (131) or the weight shaft (133) may be formed with a drum on which the anchoring wire (111) or the weight wire (113) is wound.

A one-way clutch may be applied to between the anchoring shaft (131) and the drum wound with the anchoring wire (111). The drum may encompass a portion of the anchoring shaft (131), and the one-way clutch may be formed between the drum and the anchoring shaft (131). The drum may rotate along with the anchoring shaft (131) while idling relative to the anchoring shaft (131) in a rotating direction of the anchoring wire (111) being wound, and transmitting a force to the anchoring shaft (131) in a rotating direction of the anchoring wire (111) being unwound. That is, when the floating unit (200) receives a force to generate tension to the anchoring wire (111), the drum and the anchoring shaft (131) rotate together to transmit the power to the energy unit (300) and the weight shaft (133), and when the tension is reduced on the anchoring wire (111), only the drum is rotated to allow the anchoring wire (111) to be wound.

A one-way clutch may be applied to between the weight shaft (133) and the drum wound with the weight wire (113).

The drum may encompass a portion of the weight shaft (133), and the one-way clutch may be mounted between the drum and the weight shaft (133). The drum may rotate along with the weight shaft (131) while idling relative to the weight shaft (133) in a rotating direction of the weight wire (113) being wound, and transmitting a force to the weight shaft (133) in a rotating direction of the weight wire (113) being unwound. That is, when the weight unit (150) descends to release the potential energy, the weight shaft (133) and the drum rotate together, and when the weight unit ascends while the potential energy is accumulated, the drum and the weight shaft may idle together.

One weight shaft (133) may be connected with a plurality of weight wires (113). One anchoring shaft (131) may be connected with a plurality of anchoring wires (111). Thus, the powers of each wire (110) are mutually reinforced to rotate the weight shaft (133) or the anchoring shaft (131), whereby the energy smoothing can be accomplished.

The rotating power of the weight shaft (133) or the anchoring shaft (131) may be transmitted to the energy unit (300). The drum respectively wound by the weight wire (113) or the anchoring wire (111) may be respectively connected to the weight shaft (133) or the anchoring shaft (131) through the one-way clutch. Thus, even if there is no power to be transmitted by one of the wire (110) in the plurality of wires (110), and when there remains a power to be transmitted by the remaining wire (110), the movement of the other wire (110) is not hindered while an energy of high-powered wire (110) is transmitted to the energy unit (300) by the one-way clutch, such that the floating apparatus according to the present invention can perform the energy smoothing.

The energy unit (300) may receive the power from the transfer unit (100), and the transmitted power may be stored as an electric or hydraulic energy. The energy stored in the electric or hydraulic energy may be transmitted to the land through an energy transfer cable (311).

When the power received by the energy unit (300) from the transfer unit (100) is stored in electric energy, the energy transfer cable (311) may be an electric wire. When the power received by the energy unit (300) from the transfer unit (100) is stored in hydraulic energy, the energy transfer cable (311) may be a hydraulic hose.

The floating apparatus according to the present invention is such that the wave energy can be converted by the energy unit (300) inside the floating unit (200) to electric or hydraulic energy to be transmitted to the land or fixed structure, whereby the installation cost in a marine environment can be reduced.

For example, in case of coastal topography where water level (depth) is slowly deepened, a distance from an installation position of the floating apparatus to the land may be quiet long or distant. In this case, the installation cost may increase when electricity is generated by drawing the power from the land facilities.

Furthermore, in another example, in case of a coast being of a vertical sheer cliff, and when the electricity generating facilities are installed on land, the installation cost will inevitably increase. However, when the energy processed and generated on the sea by way of electric or hydraulic method is transmitted to land, as in the floating apparatus according to the present invention, the installation cost may be saved.

Figure 7:
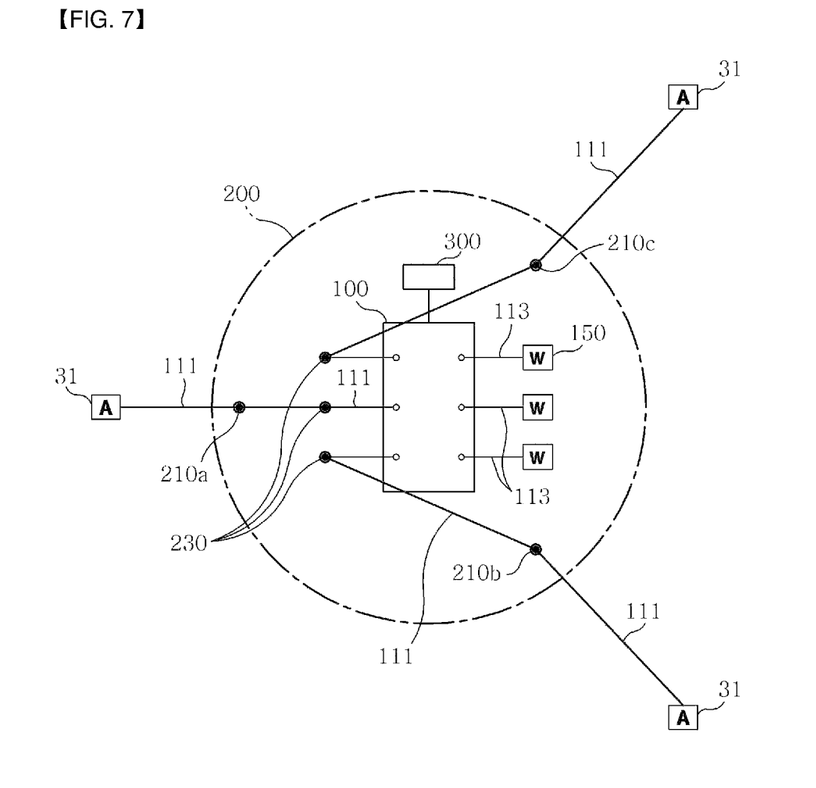
FIG. 7 is a conceptual view illustrating a wiring of an anchoring wire in a floating unit according to the present invention.
Figure 8:
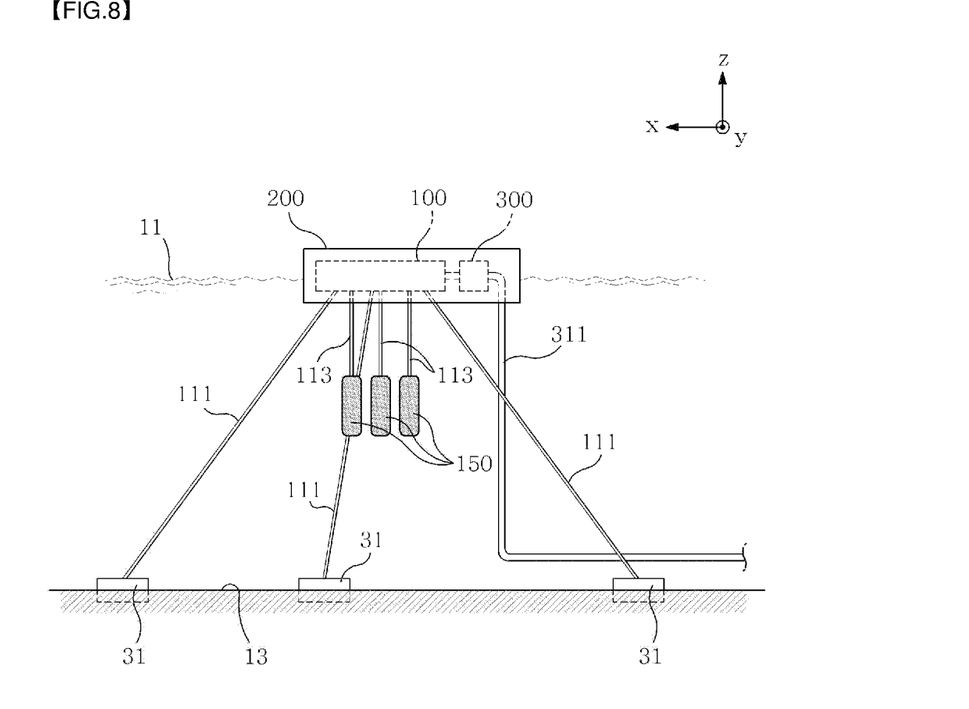
FIG. 8 is a front view (frontal elevation) illustrating a floating apparatus for wave power generation according to the present invention.

The floating apparatus according to the present invention is such that the anchoring wire (111) must be spaced apart from the passage units (210a, 210b, 210c) which are positions where the floating unit (200) is introduced from outside, and the plurality of anchoring wires (111) may be wound on one anchoring shaft (131).

A distal end of wire connected to the floating unit (200) is anchored to a sea bottom at an external side of the floating unit, and therefore, a distal end of wire faces a direction where the other end of the wire is concentrated toward the floating unit from the anchored position. Wires positioned at an external side of the floating unit may mutually have a large gap, but converge at the distal end of the wires toward the floating unit.

Meanwhile, when at least more than three wires are installed, these wires may be concentrated to a direction facing from an inside of the floating unit toward the transfer unit and energy unit.

Hence, there may be required a need of collecting the anchoring wires each spaced apart from an inside of the floating unit (200) to one place. Thus, the floating unit (200) may be disposed with a direction change unit (230) for collecting the anchoring wires (111) to one place. The direction change unit (230) may a means that bends or flexes the anchoring wires (111) while maintaining tensions, and may be a pulley, a sliding bearing or a guide pipe.

Meantime, the floating apparatus according to the present invention may be disposed with a configuration for safe evacuation. When excessive waves such as storms are generated on the seas, and when the floating apparatus is being left unattended, the floating apparatus may be damaged by the storms. It would be difficult to receive the kinetic energy from waves. Thus, there is required a need of a means to be prepared for bad weather like storms.

As a means against the inclement climate, a safety coupling (170) to relieve excessive tensions and a display buoy (180) enabling to ascertain a position of the anchoring unit (31) on the sea surface (11) may be provided.

Figure 9:
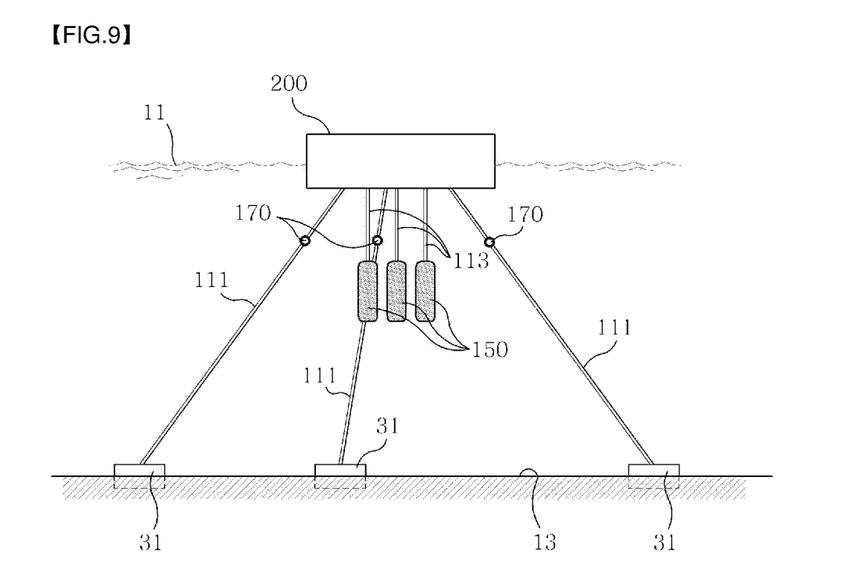
FIG. 9 is a conceptual view illustrating a floating apparatus for wave power generation according to the present invention before safety evacuation.
Figure 10:
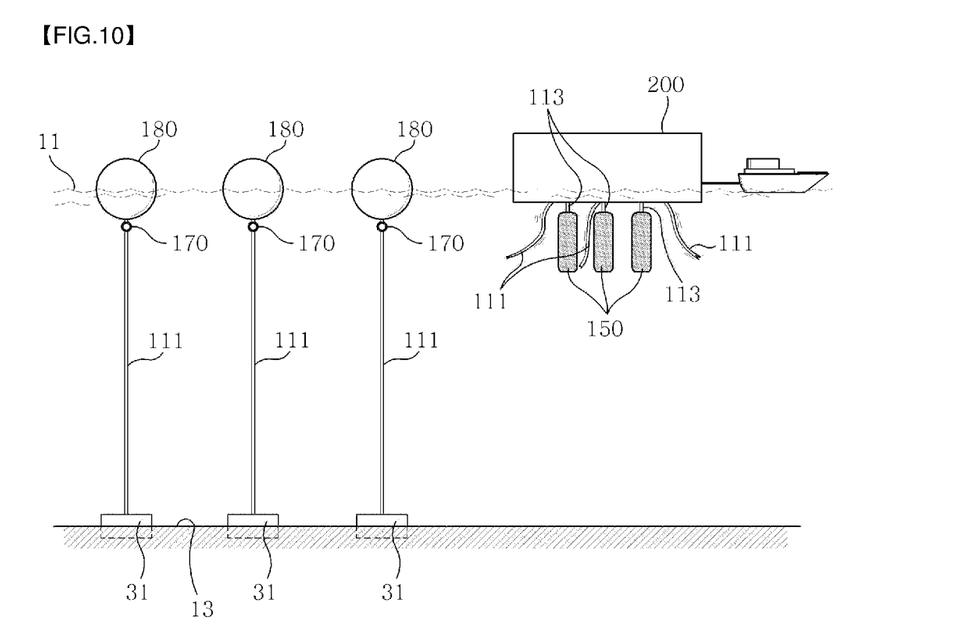
FIG. 10 is a schematic view illustrating a floating apparatus for wave power generation according to the present invention after safety evacuation.

Referring to FIGS. 9 and 10, FIG. 9 is a conceptual view illustrating a floating apparatus for wave power generation according to the present invention before safety evacuation, and FIG. 10 is a schematic view illustrating a floating apparatus for wave power generation according to the present invention after safety evacuation.

The safety coupling (170) may be disposed at an anchoring wire (111) between the floating unit (200) and the anchoring unit (31). When an excessive tension is detected on the anchoring wire (111), the safety coupling (170) may be released to disconnect the anchoring wire (111) between the floating unit (200) and the anchoring unit (31). When the anchoring wire (111) is disconnected, the floating unit (200) can be evacuated to a place where there is no influence of storms.

The display buoy (180) may be installed at the anchoring wire (111) at the anchoring unit (31) side in the two separated anchoring wires (111) when the anchoring wires (111) are disconnected. When the display buoy (180) is installed at the anchoring wire (111), a distal end at one side of the anchoring wire (111) may be positioned at the sea surface (11) after the storms are gone later. Hence, the position of the anchoring unit (31) can be easily ascertained when re-installed, and therefore, diving operations to retrieve the anchoring wire (111) can be omitted.

The safety evacuation during storms according to the floating apparatus of the present invention may be performed in the following manner. That is, the safety evacuation may include:

installing the display buoy (180) to the anchoring wire (111);
pulling up the weight unit (150);
releasing the safety coupling (170); and
evacuating the floating unit (200).

When the anchoring unit is separated from the floating unit, a tug boat tugs the floating unit, and evacuates the floating unit to a safe place such as seawall.

Because the anchoring wire or the anchoring unit has less fear of being damaged even during the storms, and must be re-connected when the evacuated floating unit is returned, the anchoring wire or the anchoring unit may be positioned at an original position on the sea.

| [Description of Reference Numerals] | |
| --- | --- |
| 11 sea surface | 13 sea bottom surface |
| 31 anchoring unit | 100 transfer unit |
| 110 wire | 111 anchoring wire |
| 113 weight wire | 130 power transfer unit |
| 131 anchoring shaft | 133 weight shaft |
| 150 weight unit | 170 safety coupling |
| 180 display buoy | 200 floating unit |
| 210a, 210b, 210c passage units | 230 direction change unit |
| 300 energy unit | 311 energy transfer cable |

The invention claimed is:

1. A floating apparatus for wave power generation, the apparatus comprising:
   a floating unit floating on a sea surface;
   an energy unit configured to convert a kinetic energy of the floating unit to an electric or hydraulic energy; and
   a transfer unit configured to transfer the kinetic energy of the floating unit to the energy unit, wherein the transfer unit and the energy unit are provided at an inside of the floating unit;
   an energy smoothing unit generating a restoring force to allow the floating unit to return to an initial position, or smoothing a generation amount of the energy unit;
   anchoring units fixed to a sea bottom surface;
   anchoring wires having one distal ends connected to the anchoring units and the other distal ends connected to the transfer unit;
   weight wires having one distal ends connected to the transfer unit and the other distal ends connected to the energy smoothing unit;
   wherein when a tension increases on the anchoring wires by a periodic motion of a wave, an energy applied to the anchoring wires is transmitted to the energy unit, and when the tension of the anchoring wires decreases, a potential energy stored in the energy smoothing unit is transmitted to the energy unit;
   the transfer unit includes an anchoring shaft wound by the anchoring wires and a weight shaft wound by the weight wires, and a rotational force of the weight shaft and a rotational force of the anchoring shaft are transmitted to the energy unit;

the anchoring wires and the weight wires are mutually separated and independently connected to the anchoring shaft through a first one-way clutch and the weight shaft through a second one-way clutch, respectively;

a tension of at least one of the anchoring wires and the weight wires is transmitted to the energy unit through at least one of the first and second one-way clutches; and the energy unit absorbs translational and rotational kinetic energy of the floating unit;

wherein the floating unit further comprises passage units, and the number of the anchoring wires is the same as the number of the passage units;

each anchoring wire is connected to the transfer unit through each passage unit the anchoring wires are connected to the transfer unit by being inserted from an outside to an inside of the floating unit through the passage units; and the passage units are spaced apart to absorb translational and rotational kinetic energy through the anchoring wires;

the anchoring wires comprise at least three anchoring wires, two of the three anchoring wires having the one distal ends connected to the anchoring units to be fixed to the sea bottom surface and the other distal ends connected to the transfer unit through the passage units;

the passage units comprises three passage units arranged in a way that, an extending line on which two of the passage units are positioned, and the remaining passage unit is spaced apart from the extending line at a predetermined distance.

2. The floating apparatus of claim 1, wherein the anchoring shaft and the weight shaft are differently connected in gear ratio to the energy unit; and a rotational amount of the anchoring shaft is greater than that of the weight shaft.

3. The floating apparatus of claim 1, wherein the floating unit includes a direction change unit for collecting the tension of the anchoring wires to the energy unit; and the direction change unit bends or flexes a winding or releasing direction of the anchoring wires while maintaining the tension of the anchoring wires.

4. The floating apparatus of claim 1 further comprising a position restricting means restricting a floating position of the floating unit, a kinetic energy of the floating unit is transferred to the energy unit through the position restricting means, and the position restricting means is attachably and detachably connected to the floating unit.

* * * * *